(12) United States Patent
Kawahara et al.

(10) Patent No.: US 10,883,565 B2
(45) Date of Patent: Jan. 5, 2021

(54) HYDRAULIC POWER TRANSMISSION DEVICE

(71) Applicant: EXEDY Corporation, Neyagawa (JP)

(72) Inventors: Yuki Kawahara, Neyagawa (JP);
Yusuke Okamoto, Neyagawa (JP);
Yusuke Okamachi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 432 days.

(21) Appl. No.: 15/329,113

(22) PCT Filed: Jan. 23, 2015

(86) PCT No.: PCT/JP2015/051925
§ 371 (c)(1),
(2) Date: Jan. 25, 2017

(87) PCT Pub. No.: WO2016/031258
PCT Pub. Date: Mar. 3, 2016

(65) Prior Publication Data
US 2017/0211656 A1    Jul. 27, 2017

(30) Foreign Application Priority Data

Aug. 29, 2014  (JP) .................................. 2014-175222

(51) Int. Cl.
*F16H 45/02* (2006.01)
*F16F 15/16* (2006.01)
(Continued)

(52) U.S. Cl.
CPC ........ *F16F 15/167* (2013.01); *F16F 15/1428* (2013.01); *F16H 45/02* (2013.01);
(Continued)

(58) Field of Classification Search
None
See application file for complete search history.

(56) References Cited

U.S. PATENT DOCUMENTS 5,125,486 A * 6/1992 Murata .................... F16H 45/02
                                                  192/208
5,180,044 A * 1/1993 Fukushima ............. F16F 15/16
                                                  192/208
(Continued)

FOREIGN PATENT DOCUMENTS

CN    103189670 A    7/2013
CN    103261732 A    8/2013
(Continued)

OTHER PUBLICATIONS

International Search Report dated Mar. 31, 2015 for corresponding foreign Application No. PCT/JP2015/051925, 2 pp.
(Continued)

*Primary Examiner* — Charles A Fox
*Assistant Examiner* — Ryan P Dodd
(74) *Attorney, Agent, or Firm* — United IP Counselors, LLC

(57) ABSTRACT

A hydraulic power transmission device includes a front cover, a torque converter main body, a lock-up device, and a dynamic damper. The dynamic damper has a base plate, inertia rings and lid members that configure an inertial body, viscosity attenuation portions, and an elastic coupling portion. The base plate is fixed to an output plate. The inertial body can move in the rotation direction relative to the base plate. The viscosity attenuation portions can generate a variable hysteresis torque according to the relative speed difference between the base plate and the inertial body.

8 Claims, 7 Drawing Sheets

(51) Int. Cl.
  *F16F 15/167* (2006.01)
  *F16F 15/14* (2006.01)
(52) U.S. Cl.
  CPC ............... *F16H 2045/0205* (2013.01); *F16H 2045/0242* (2013.01); *F16H 2045/0263* (2013.01); *F16H 2045/0294* (2013.01)

(56) References Cited

U.S. PATENT DOCUMENTS

| | | | | |
|---|---|---|---|---|
| 5,269,198 | A * | 12/1993 | Fukushima | F16F 15/13484 |
| | | | | 192/208 |
| 5,386,896 | A * | 2/1995 | Matsuoka | F16F 15/167 |
| | | | | 188/277 |
| 5,609,231 | A * | 3/1997 | Matsuoka | F16H 45/02 |
| | | | | 192/208 |
| 5,617,940 | A * | 4/1997 | Fukushima | F16F 15/13107 |
| | | | | 192/208 |
| 5,997,402 | A * | 12/1999 | Fukushima | F16F 15/13107 |
| | | | | 192/208 |
| 6,003,648 | A * | 12/1999 | Sudau | F16H 45/02 |
| | | | | 192/208 |
| 6,168,525 | B1 * | 1/2001 | Hanke | F16F 15/13476 |
| | | | | 464/27 |
| 6,695,108 | B1 * | 2/2004 | Hanke | F16F 15/161 |
| | | | | 192/208 |
| 9,416,860 | B2 * | 8/2016 | Amano | F16F 15/145 |
| 2001/0044340 | A1 * | 11/2001 | Jackel | F16F 15/13142 |
| | | | | 464/67.1 |
| 2011/0031083 | A1 * | 2/2011 | Matsuoka | F16H 45/02 |
| | | | | 192/3.29 |
| 2011/0287844 | A1 | 11/2011 | Steinberger | |
| 2012/0080281 | A1 | 4/2012 | Yoshihiro et al. | |
| 2015/0005078 | A1 | 1/2015 | Sekiguchi et al. | |

FOREIGN PATENT DOCUMENTS

| | | |
|---|---|---|
| DE | 102011101156 A1 | 11/2011 |
| JP | S59151625 A | 8/1984 |
| JP | S6319440 A | 1/1988 |
| JP | 4648428 B2 | 3/2011 |
| JP | 2011058557 A | 3/2011 |
| JP | 2012077826 A | 4/2012 |
| JP | 5555784 B1 | 7/2014 |
| WO | 2013/161058 A1 | 10/2013 |

OTHER PUBLICATIONS

First Office Action of the corresponding Chinese patent application No. 201580045035.X, dated Sep. 26, 2018, 6 pp.
1st Office Action of the corresponding Korean Application No. 10-2017-7003256, dated Nov. 5, 2020, 4 pp.

* cited by examiner

HYDRAULIC POWER TRANSMISSION DEVICE

CROSS-REFERENCE TO RELATED APPLICATIONS

This application is the U.S. National Phase of PCT International Application No. PCT/JP2015/051925, filed on Jan. 23, 2015. That application claims priority to Japanese Patent Application No. 2014-175222, filed Aug. 29, 2014. The contents of both applications are herein incorporated by reference in their entirety.

BACKGROUND

Technical Field

The present disclosure relates to a hydraulic power transmission device and in particular to a hydraulic power transmission device for transmitting power from an engine to a transmission via a fluid.

Background Art

A torque converter that is provided with a lock-up device is known as an example of a hydraulic power transmission device. The lock-up device is a mechanism for mechanically coupling a front cover and a turbine, and is arranged in the space between the turbine and the front cover.

The lock-up device has a clutch portion and a damper mechanism. The clutch portion has a piston that has a friction member, for example. When the piston moves and the friction member is pressed against the front cover, power is transmitted from the front cover to the damper mechanism via the piston. The damper mechanism has a plurality of elastic members and an output-side member to which power is transmitted via the elastic members. The output-side member is fixed to the turbine.

Such the lock-up device has conventionally been provided with a dynamic damper. Providing the dynamic damper makes it possible to reduce a torque fluctuation peak that appears in the vicinity of the resonance frequency of the damper mechanism.

Although one large torque fluctuation peak can be suppressed by the dynamic damper as described above, a torque fluctuation peak also appears at two locations, namely a rotational speed higher than and a rotational speed lower than the rotational speed at which the one large peak appears. Out of these two peaks, the peak on the lower rotational speed side appears in a rotational speed range that is lower than the normal rotational speed, and therefore is not a problem during use. However, the peak on the higher rotational speed side commonly appears in the normal rotational speed range, and therefore devices for attenuating this peak on the higher rotational speed side are shown in Japanese Patent No. 4648428B and Japanese Patent Application Publication No. 2011-58557A.

SUMMARY

In the device in Japanese Patent No. 4648428B, the dynamic damper is provided with a friction generating mechanism. The torque fluctuation (rotational speed fluctuation) attenuation rate is raised by adjusting the friction resistance in the friction generating mechanism. Also, the device in Japanese Patent Application Publication No. 2011-58557A is provided with a lock mechanism that restricts the operation of the dynamic damper in a desired rotational speed range. Here, attenuation performance is raised by the operation of the dynamic damper until a desired rotational speed is reached. When the desired rotational speed is reached, the operation of the dynamic damper is restricted, thereby causing the dynamic damper to function as a simple inertial member. Accordingly, the attenuation performance rises in this rotational speed range.

However, with the device in Japanese Patent No. 4648428B, the friction resistance changes according to variation over time, and the performance is not stable. Also, with the device in Japanese Patent Application Publication No. 2011-58557A, fluctuation occurs in the rotational speed at which the operation of the lock mechanism is to be restricted, and it is difficult to stabilize the attenuation performance.

As one method for moving the torque fluctuation peak on the high rotational speed side to an even higher rotational speed that is not problematic in practice, there is a method of providing a damper mechanism on the output side of the dynamic damper. The inventors of this application have already developed and submitted an application for a device that realizes such a method. However, there are cases where the device configuration of such a device becomes complex.

A problem to be solved by the present disclosure is stably obtaining high attenuation performance over the entirety of the normal rotational speed range with a simple configuration in a hydraulic power transmission device that has a dynamic damper.

A hydraulic power transmission device according to the present disclosure is a device for transmitting power from an engine to a transmission via a fluid. This device includes a front cover, a fluid coupling main body, a lock-up device, and a dynamic damper. The fluid coupling main body includes a turbine provided in a manner of being capable of rotating integrally with an input shaft of the transmission, and transmits power from the engine to the transmission via the fluid. The lock-up device is provided between the front cover and the turbine. The lock-up device has a clutch portion that transmits or cuts off power from the front cover and an output-side member that receives power from the clutch portion and is coupled to the turbine. The dynamic damper is fixed to the output-side member of the lock-up device, and attenuates rotational speed fluctuation from the engine. Also, the dynamic damper has a base plate, an inertial body, and an elastic unit. The base plate is fixed to the output-side member of the lock-up device. The inertial body is capable of moving in a rotation direction relative to the base plate. The elastic unit can generate a variable hysteresis torque according to a relative speed difference between the base plate and the inertial body, and couples the base plate and the inertial body elastically in the rotation direction.

Here, it is possible to attenuate rotational speed fluctuation by the operation of the dynamic damper that is fixed to the output-side member of the lock-up device. At this time, the elastic unit of the dynamic damper generates a variable hysteresis torque according to the relative speed difference between the base plate and the inertial body. For this reason, a rotational speed fluctuation peak that appears in the normal rotational speed range can be suppressed with a simple configuration.

In the hydraulic power transmission device according to another aspect of the present disclosure, the dynamic damper is fixed to the output-side member of the lock-up device.

In the hydraulic power transmission device according to yet another aspect of the present disclosure, the elastic unit has a variable hysteresis torque generation portion that generates a variable hysteresis torque, and an elastic coupling portion that has a plurality of elastic members.

In the hydraulic power transmission device according to still another aspect of the present disclosure, the elastic unit generates a larger hysteresis torque when the relative speed difference between the base plate and the inertial body is large than when the relative speed difference is small.

In the hydraulic power transmission device according to still another aspect of the present disclosure, the elastic unit has a viscosity attenuation portion that generates the hysteresis torque by viscosity resistance.

In the hydraulic power transmission device according to still another aspect of the present disclosure, the viscosity attenuation portion has an oil chamber filled with a hydraulic oil, and a piston. The piston is arranged in the oil chamber and can move in the rotation direction in the oil chamber along with the base plate.

In the hydraulic power transmission device according to still another aspect of the present disclosure, the elastic unit has a plurality of coil springs that couple the base plate and the inertial body elastically in the rotation direction.

In the hydraulic power transmission device according to still another aspect of the present disclosure, the base plate is ring-shaped, and has a plurality of openings in an outer circumferential portion with predetermined intervals therebetween in the circumferential direction. The inertial body has a first inertia ring and a second inertia ring, and a first lid member and a second lid member. The first inertia ring and a second inertia ring are arranged sandwiching the outer circumferential portion of the base plate in an axial direction, are each ring-shaped, and each have openings at positions that correspond to the openings of the base plate. The first lid member and a second lid member are respectively arranged on sides of the first inertia ring and the second inertia ring opposite to a base plate side, and are arranged in a manner of obstructing the openings of the first and second inertia rings. The plurality of coil springs of the elastic unit are housed in the openings of the base plate and the first and second inertia rings.

The present disclosure described above can stably obtains high attenuation performance over the entirety of the normal rotational speed range with a simple configuration in a hydraulic power transmission device that has a dynamic damper.

DETAILED DESCRIPTION OF EMBODIMENTS

Overall Configuration

Figure 1:
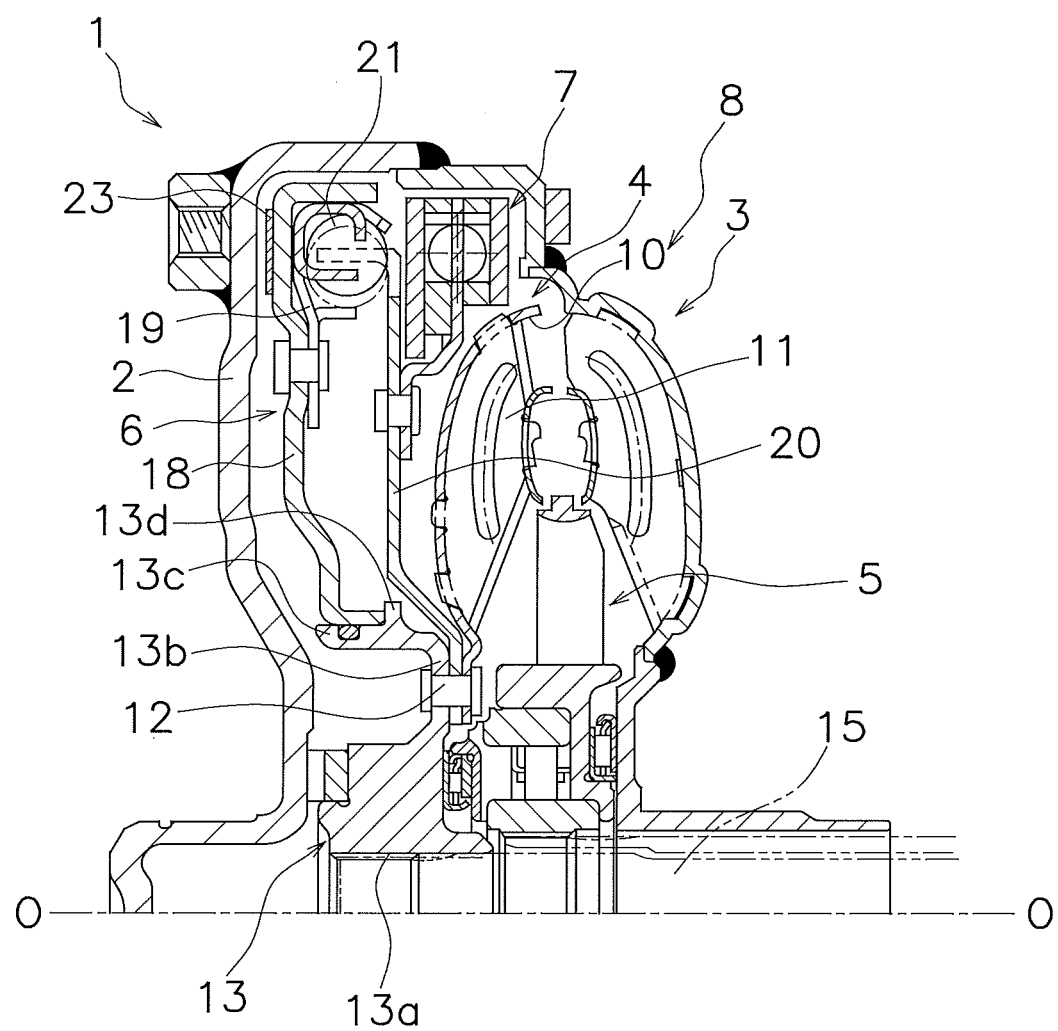
FIG. 1 is a cross-sectional view of a torque converter according to an embodiment of the present disclosure.

A torque converter 1 serving as a hydraulic power transmission device is shown in FIG. 1. An engine (not shown) is arranged on the left side in FIG. 1, and a transmission (not shown) is arranged on the right side in FIG. 1. A line O-O shown in FIG. 1 is the rotation axis of the torque converter 1.

The torque converter 1 is a device for transmitting power from a crankshaft (not shown) of the engine to an input shaft of the transmission. The torque converter 1 is mainly provided with a front cover 2 to which power is input, an impeller 3, a turbine 4, a stator 5, a lock-up device 6, and a dynamic damper 7. A torque converter main body (fluid coupling main body) 8 is configured by the impeller 3, the turbine 4, and the stator 5.

Front Cover 2

The impeller 3 is fixed to the front cover 2, and a fluid chamber is formed by the front cover 2 and the impeller 3. The turbine 4 is arranged in opposition to the impeller 3 inside the fluid chamber. The turbine 4 has a turbine shell 10, a plurality of turbine blades 11 that are provided inside the turbine shell 10, and a turbine hub 13 that is fixed to the turbine shell 10 by rivets 12. The stator 5 is a mechanism for adjusting the flow of hydraulic oil from the turbine 4 to the impeller 3, and is arranged between the inner circumferential portion of the impeller 3 and the inner circumferential portion of the turbine 4.

The turbine hub 13 has a spline hole 13a in its central portion, and an input shaft 15 of the transmission can engage with the spline hole 13a. The turbine hub 13 also has a flange portion 13b that extends radially outward, and a tubular portion 13c that extends from the outer circumferential portion of the flange portion 13b toward the front cover 2. The inner circumferential portion of the turbine shell 10 is fixed to the flange portion 13b by the rivets 12 as previously mentioned. Also, a protrusion 13d that protrudes farther radially outward is formed on the outer circumferential face of the tubular portion 13c.

Lock-Up Device 6

Figure 2:
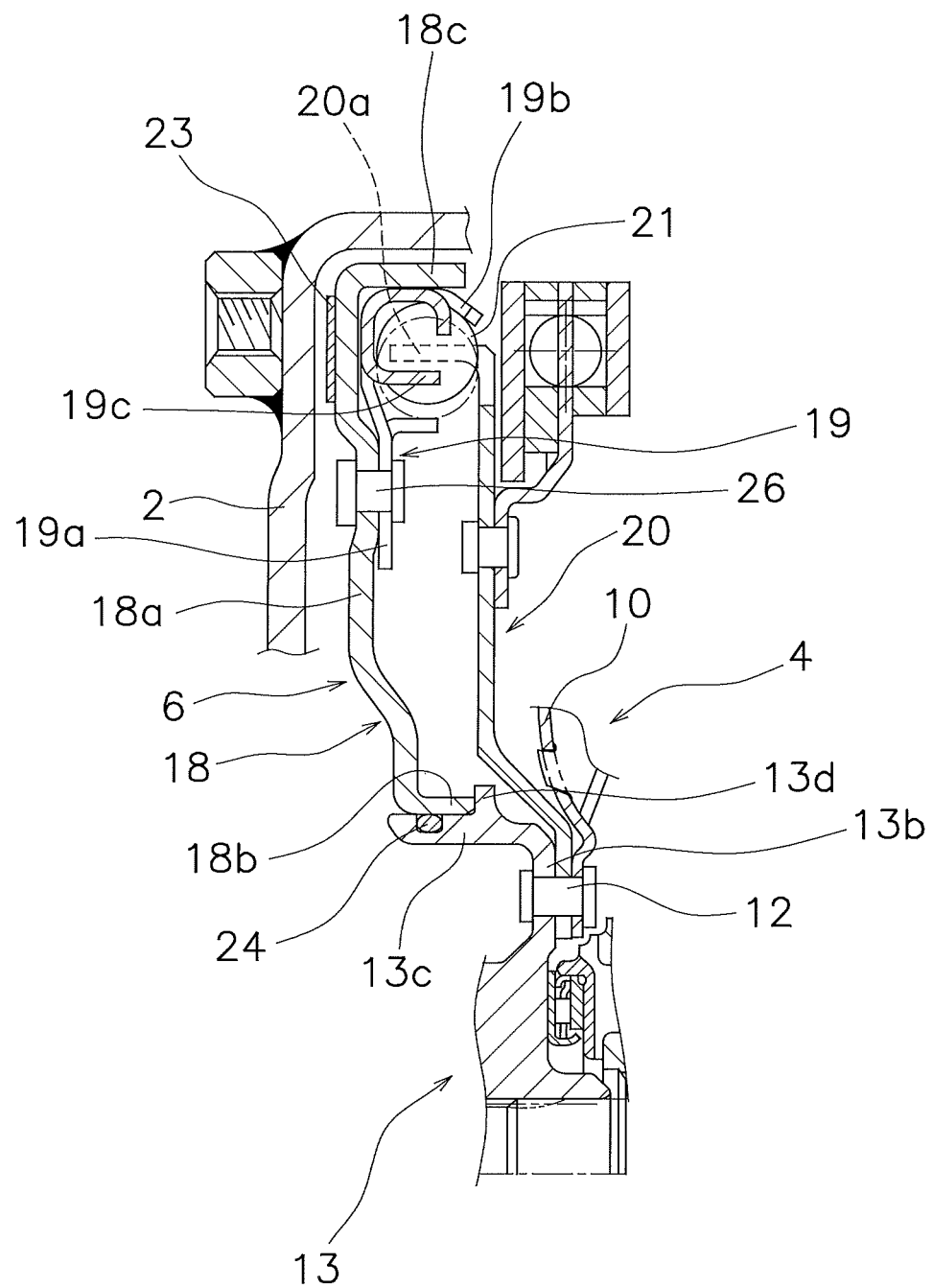
FIG. 2 is an extracted view of a lock-up device in FIG. 1.

FIG. 2 is an extracted view of the lock-up device 6. The lock-up device 6 is a device for mechanically coupling the front cover 2 and the turbine 4 as necessary, and is arranged between the front cover 2 and the turbine 4. The lock-up device 6 has a piston 18, a drive plate 19, an output plate 20 (output-side member), and a plurality of coil springs 21.

Piston 18

The piston 18 is arranged in a manner of being capable of sliding in the axial direction between the front cover 2 and the turbine 4. The piston 18 has a disc-shaped main body portion 18a, an inner circumferential tubular portion 18b that extends from the inner circumferential end of the main body portion 18a toward the turbine 4, and an outer circumferential tubular portion 18c that extends from the outer circumferential end of the main body portion 18a toward the turbine 4.

The main body portion 18a is arranged in opposition to the front cover 2. A ring-shaped friction member 23 is fixed to the side face, on the front cover 2 side, of the outer circumferential portion of the main body portion 18a. The inner circumferential tubular portion 18b is supported on the outer circumferential face of the tubular portion 13c of the turbine hub 13 in a manner of being capable of moving in the axial direction and in the rotation direction. A seal member 24 is arranged on the outer circumferential face of the tubular portion 13c of the turbine hub 13. Accordingly, the region between the inner circumferential tubular portion 18b of the piston 18 and the outer circumferential face of the tubular portion 13c of the turbine hub 13 is sealed. Note that the leading end of the inner circumferential tubular portion 18b can abut against the protrusion 13d of the turbine hub 13, and movement of the piston 18 toward the turbine 4 is restricted by the protrusion 13d.

Drive Plate 19

The drive plate 19 is arranged on the outer circumferential portion of the piston 18, on the turbine 4 side of the piston 18. Also, the drive plate 19 is arranged radially inward of the outer circumferential tubular portion 18c of the piston 18. The drive plate 19 is ring-shaped, and has a fixing portion 19a, a plurality of spring housing portions 19b, and a plurality of engaging portions 19c.

The fixing portion 19a is formed in the inner circumferential end portion of the drive plate 19, and is fixed to the piston 18 by rivets 26. The spring housing portions 19b and the engaging portions 19c are arranged alternatingly in the circumferential direction. The spring housing portions 19b have a C-shaped cross-section, and the coil springs 21 are housed inside the spring housing portions 19b. The engaging portions 19c have a C-shaped cross-section, and a portion on the inner circumferential side and a portion on the outer circumferential side engage with the two ends of a coil spring 21. Due to these engaging portions 19c, power transmitted to the piston 18 is transmitted to the coil springs 21 via the drive plate 19.

Output Plate 20

The output plate 20 is disc-shaped, and is arranged between the piston 18 and the turbine 4. The inner circumferential end portion of the output plate 20 is fixed to the flange portion 13b of the turbine hub 13 together with the turbine shell 10 by the rivets 12. A plurality of engaging portions 20a, which are bent toward the front cover 2, are provided on the outer circumferential end portion of the output plate 20. The engaging portions 20a are engaged with the two ends of the coil springs 21.

Coil Springs 21

The coil springs 21 couple the piston 18 and the drive plate 19 to the output plate 20 elastically in the rotation direction. As previously mentioned, the coil springs 21 are housed in and supported by the spring housing portions 19b of the drive plate 19.

Dynamic Damper 7

Figure 3:
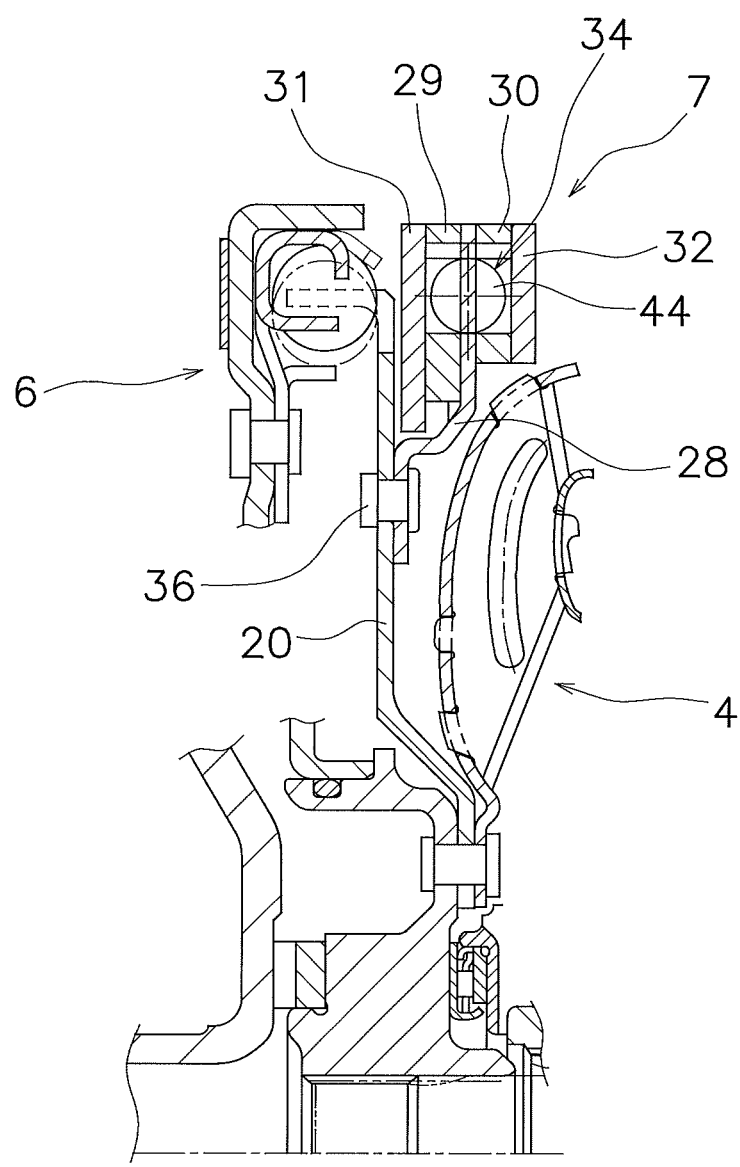
FIG. 3 is an extracted view of a dynamic damper in FIG. 1.
Figure 4:
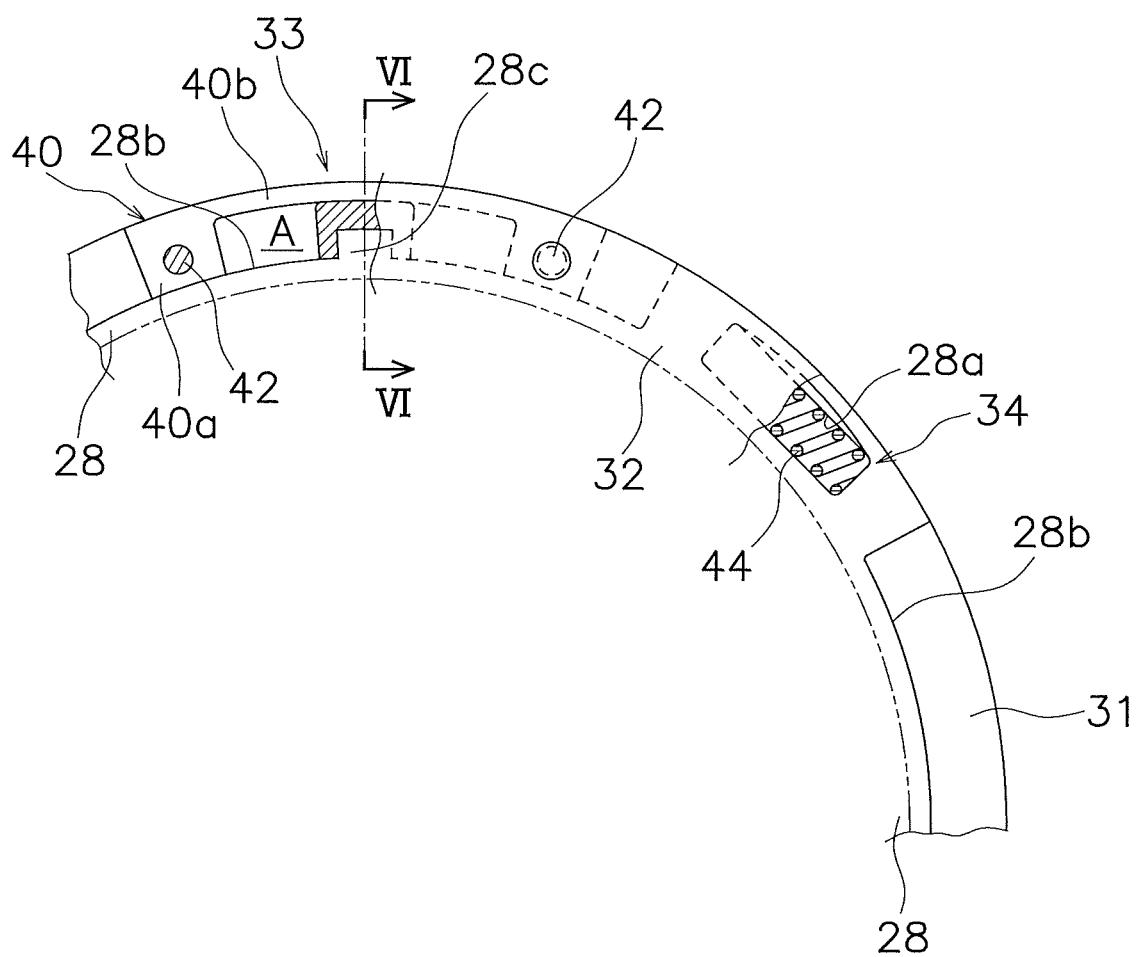
FIG. 4 is a partial front view of the dynamic damper.

The dynamic damper 7 is a device for attenuating rotational speed fluctuation from the engine, and is arranged between the output plate 20 and the impeller 3 as shown in FIGS. 1, 3, and 4. The dynamic damper 7 has a base plate 28, first and second inertia rings 29 and 30, first and second lid members 31 and 32, viscosity attenuation portions (variable hysteresis torque generation portions) 33, and an elastic coupling portion 34. An elastic unit is configured by the viscosity attenuation portions 33 and the elastic coupling portion 34.

Note that FIG. 4 is an external view of the dynamic damper 7 from the transmission side, and some members have been removed from the view. Specifically, FIG. 4 is a view in which the second inertia ring 30 and the second lid member 32 have been removed from the portions shown on the two circumferential sides in the external view.

Base Plate 28

As shown in FIG. 3, the base plate 28 is disc-shaped, and the inner circumferential end portion thereof is fixed to an intermediate portion, in the diameter direction, of the output plate 20 by rivets 36. The outer circumferential portion of the base plate 28 is biased toward the transmission side in the axial direction relative to the inner circumferential end portion.

As shown in FIG. 4, the base plate 28 has four spring housing portions 28a and four notches 28b with predetermined intervals therebetween in the circumferential direction. The spring housing portions 28a and the notches 28b are arranged alternatingly in the circumferential direction. The spring housing portions 28a are openings that extend in the circumferential direction and are closed on the outer circumferential side. The four notches 28b have a predetermined length in the circumferential direction, and are formed with openings on the outer circumferential side. Also, protrusions 28c that protrude circumferentially outward are formed on two opposing notches 28b among the four notches 28b. The protrusions 28c are formed in the center of the notches 28b in the circumferential direction, and have a height that is approximately ½ the depth (length in the diameter direction) of the notches 28b.

First and Second Inertia Rings 29, 30

The first and second inertia rings 29 and 30 are formed by performing pressing on a sheet metal member. The first inertia ring 29 is arranged between the outer circumferential portion of the output plate 20 and the outer circumferential portion of the base plate 28. The second inertia ring 30 is arranged on the transmission side of the base plate 28. The outer diameter of the first inertia ring 29 is the same as that of the second inertia ring 30, but the inner diameter is smaller than that of the second inertia ring 30.

Figure 5:
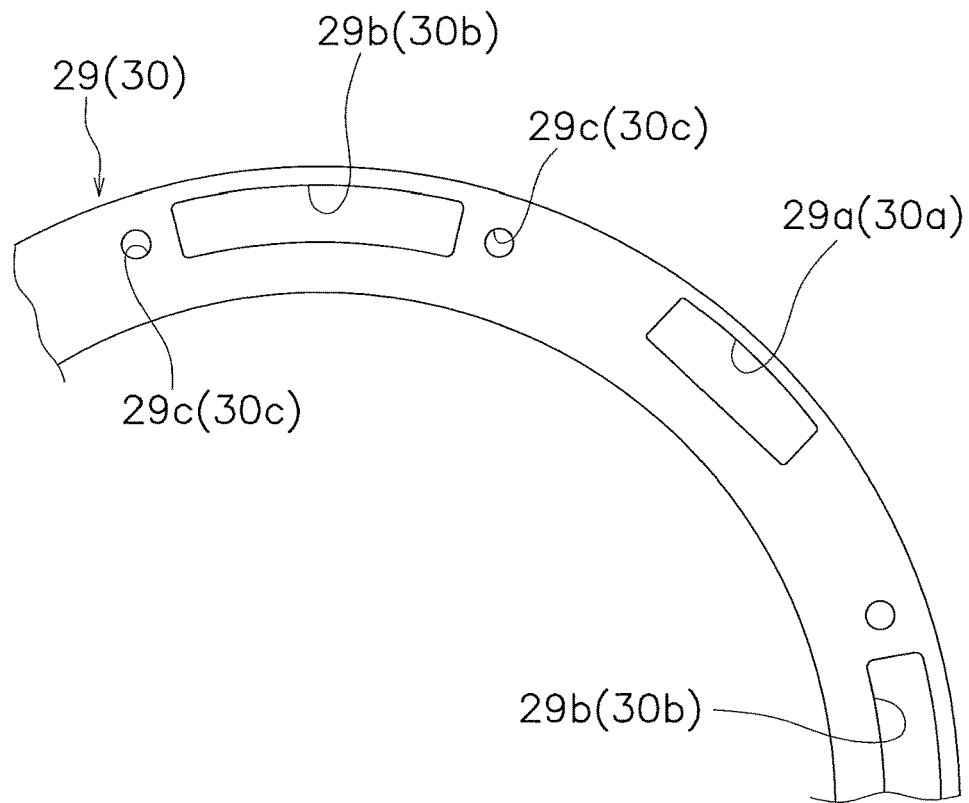
FIG. 5 is a partial front view of an inertia ring.

The first inertia ring 29 is shown in FIG. 5. The first inertia ring 29 and the second inertia ring 30 are only different in terms of the inner diameter dimension, and therefore reference signs for the second inertia ring 30 are also shown along with those for the first inertia ring 29 in FIG. 5.

The first and second inertia rings 29 and 30 have the four spring housing portions 29a and 30a with predetermined intervals therebetween in the circumferential direction. The spring housing portions 29a and 30a are formed at positions that correspond to the spring housing portions 28a of the base plate 28. The spring housing portions 29a and 30a are openings that are closed on the outer circumferential side, and the length thereof in the circumferential direction is the same as that of the spring housing portions 28a of the base plate 28. Also, the first and second inertia rings 29 and 30 have openings 29b and 30b at positions that correspond to the four notches 28b of the base plate 28. The openings 29b and 30b are closed on the outer circumferential side. The circumferential length of the openings 29b and 30b is shorter than the circumferential length of the notches 28b of the base plate 28.

First and Second Lid Members 31, 32

As clearly shown in FIG. 3, the first lid member 31 is arranged farther on the engine side than the first inertia ring 29. The first lid member 31 is a ring-shaped member, and the inner diameter thereof is smaller than the inner diameter of the first inertia ring 29. The second lid member 32 is arranged farther on the transmission side than the second inertia ring 30. The second lid member 32 is a ring-shaped member, and the inner diameter thereof is the same as that of the second inertia ring 30.

Viscosity Attenuation Portions 33

Figure 6:
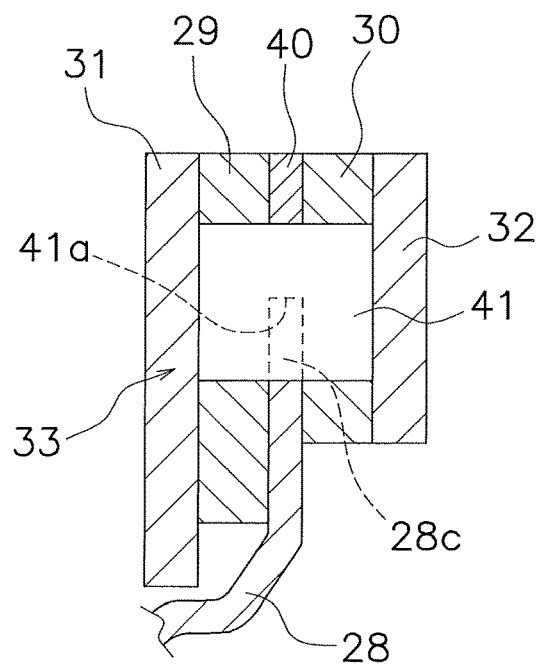
FIG. 6 is a cross-sectional view of the dynamic damper.

The viscosity attenuation portions 33 are provided at two opposing locations. The viscosity attenuation portion 33 at one location is shown in FIG. 4. As shown in FIGS. 4 and 6, the viscosity attenuation portions 33 have an oil chamber formation member 40 and a piston 41.

Figure 7:
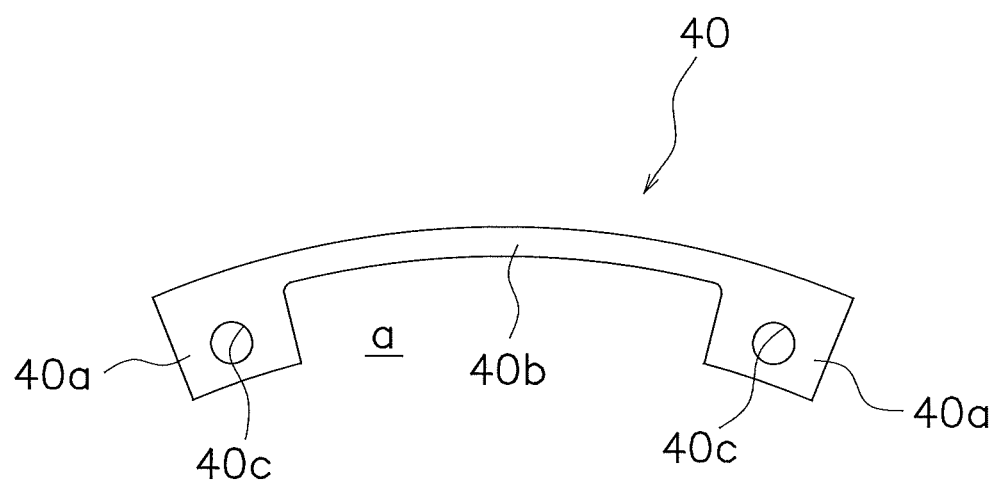
FIG. 7 is a front view of an oil chamber formation member.

As shown in FIGS. 4 and 7, the oil chamber formation members 40 are formed by plates shaped as a circular arc, and are arranged in two opposing notches 28b among the four notches 28b of the base plate 28. Each oil chamber formation member 40 has a pair of leg portions 40a and a connecting portion 40b that connects the pair of leg portions 40a. The pair of leg portions 40a are formed at the two end portions of the oil chamber formation member 40 in the circumferential direction. The height (length in the diameter direction) of the leg portion 40a is the same as the depth (length in the diameter direction) of the notches 28b of the base plate 28. The connecting portion 40b connects the outer circumferential portions of the pair of leg portions 40a. In other words, a space a is formed on the inner circumferential side of the connecting portion 40b. An oil chamber space is formed by the space a and the openings 29b and 30b of the first and second inertia rings 29 and 30. This space is blocked in the axial direction by the first and second lid members 31 and 32, thus forming an oil chamber A (see FIG. 4).

Note that the oil chamber formation members 40 are each fixed by rivets 42 (see FIG. 4) that pass through through-holes 40c formed in the pair of leg portions 40a, through-holes 29c and 30c formed in the first and second inertia rings 29 and 30, and through-holes formed in the first and second lid members 31 and 32 (not shown). Also, due to these rivets 42, the first and second inertia rings 29 and 30 and the first and second lid members 31 and 32 are fixed in a manner of being incapable of relative rotation and incapable of moving in the axial direction.

Figure 8:
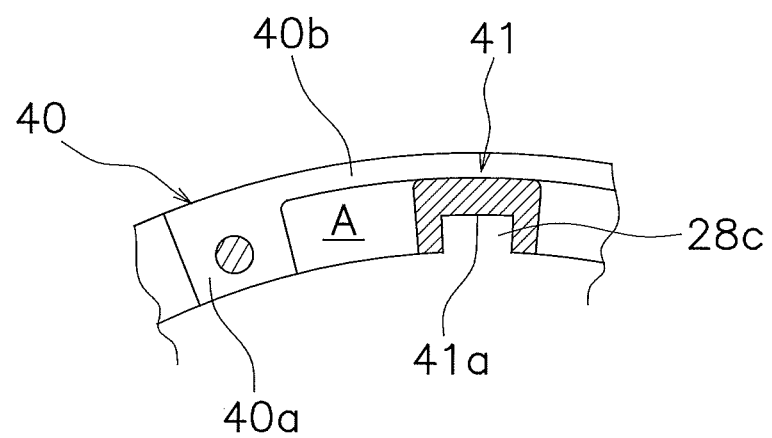
FIG. 8 is an enlarged view of a viscosity attenuation mechanism.

As shown in FIGS. 4 and 8, the piston 41 is a block-shaped member, and is formed from resin. The piston 41 is arranged in a manner of being capable of sliding in the circumferential direction in the oil chamber A. A groove 41a that has a predetermined depth toward the outer circumferential side is formed in the inner circumferential surface of the piston 41. A protrusion 28c of the base plate 28 is inserted into the groove 41a. The piston 41 and the base plate 28 therefore rotate in synchronization.

Also, a slight gap is formed between the outer circumferential face of the piston 41 and the inner circumferential wall surface of the oil chamber A (the wall surface formed by the inner circumferential surface of the connecting portion 40b and the inner circumferential surfaces of the openings 29b and 30b of the first and second inertia rings 29 and 30), and hydraulic oil on the two sides of the piston 41 can flow through this gap. In other words, the gap functions as a restrictor.

Elastic Coupling Portion 34

As shown in FIGS. 1 to 3 and FIG. 4, the elastic coupling portion 34 has a plurality of coil springs 44 that are housed in the spring housing portions 28a of the base plate 28 and the spring housing portions 29a and 30a of the first and second inertia rings 29 and 30. The base plate 28 is coupled elastically in the rotation direction to the two inertia rings 29 and 30 and the two lid members 31 and 32 by the coil springs 44.

Operations

First, operations of the torque converter main body will be described briefly. While the front cover 2 and the impeller 3 are rotating, hydraulic oil flows from the impeller 3 toward the turbine 4, and power is transmitted from the impeller 3 to the turbine 4 via the hydraulic oil. The power transmitted to the turbine 4 is then transmitted to the input shaft 15 of the transmission via the turbine hub 13.

When the speed ratio of the torque converter 1 rises, and the input shaft 15 reaches a certain rotational speed, the hydraulic oil is drained from the space between the front cover 2 and the piston 18 and supplied to the turbine 4 side of the piston 18. Accordingly, the piston 18 is moved toward the front cover 2. As a result, the friction member 23 fixed to the piston 18 is pressed against the front cover 2, and the lock-up clutch enters the ON state.

In the clutch ON state described above, power from the engine is transmitted to the input shaft 15 of the transmission via the following path: front cover 2→piston 18→drive plate 19→coil spring 21→output plate 20→turbine hub 13.

With the lock-up device 6, power is transmitted via the above-described path, and rotational speed fluctuation input from the engine is absorbed and attenuated by the operation of the coil springs 21.

Operations of Dynamic Damper 7

The dynamic damper 7, which is fixed to the output plate 20, operates due to rotation of the output plate 20, and rotational speed fluctuation from the engine is suppressed by the action of the dynamic damper 7. In other words, the action of the coil springs 44 produces phase shift between the rotation of the base plate 28 and the rotation of the inertia rings 29 and 30 and lid members 31 and 32. Specifically, at a predetermined engine speed, the fluctuation phase of the inertia rings 29 and 30 and the lid members 31 and 32 cancels out the rotational speed fluctuation of the base plate 28. Due to this phase shifting, it is possible to absorb rotational speed fluctuation in the transmission.

Figure 9:
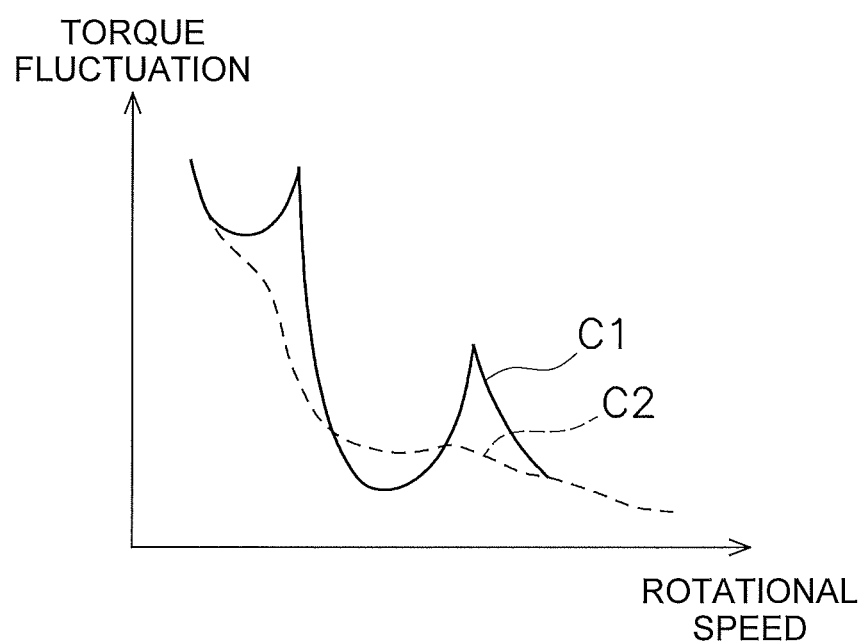
FIG. 9 is a diagram showing a relationship between engine rotational speed and output-side torque fluctuation.

Also, in the case where the relative rotational speed difference between the base plate 28 and the inertia rings 29 and 30 and lid members 31 and 32 is large, a relatively large rotation resistance, that is to say hysteresis torque, is generated in the viscosity attenuation portions 33. Also, in the case where the relative rotational speed difference is small, a relatively small hysteresis torque is generated. For this reason, as shown in FIG. 9, it is possible to suppress resonance peaks that appear due to the dynamic damper, and it is possible to suppress torque fluctuation over the entirety of the normal rotational speed range. In FIG. 9, C1 indicates a characteristic in the case where the viscosity attenuation portions 33 are not provided, and C2 indicates a characteristic in the case where the viscosity attenuation portions 33 are provided.

Other Embodiments

The present disclosure is not limited to the embodiment described above, and various modifications and alterations can be made without departing from the scope of the present disclosure.

(a) Although the elastic unit is configured by the viscosity attenuation portions and the elastic coupling portion, these portions may be formed in an integrated manner.

(b) The variable hysteresis torque generation portion is not limited to the viscosity attenuation portions. The variable hysteresis torque generation portion may be configured without using a fluid.

(c) The configuration of the viscosity attenuation portions is not limited to the above embodiment. For example, a configuration is possible in which members fixed to the base plate are arranged in the oil chambers, holes are formed in the circumferential direction in the fixed members, and these through-holes function as restrictors.

(d) In the above embodiment, there are no particular limitations on the torsional characteristic of the dynamic damper 7, and the torsional characteristic of the dynamic damper 7 may be a one-stage torsional characteristic, or a torsional characteristic having two or more stages.

(e) Although the clutch portion is configured by the piston and the friction member in the above embodiment, the clutch portion may be a multi-plate clutch portion that has a plurality of clutch plates.

(f) Although the dynamic damper is mounted to an output-side member in the above embodiment, it may be mounted to another member.

REFERENCE SIGNS LIST

1 Torque converter
2 Front cover
4 Turbine
6 Lock-up device
7 Dynamic damper
8 Torque converter main body
20 Output plate (output-side member)
21 Coil spring
28 Base plate
28a Spring housing portion (opening)
29, 30 Inertia ring
29a, 30a Spring housing portion (opening)
31, 32 Lid member
33 Viscosity attenuation portion
34 Elastic coupling portion
40 Oil chamber formation member
41 Piston
44 Coil spring
A Oil chamber

The invention claimed is:

1. A hydraulic power transmission device for transmitting power from an engine to a transmission via a fluid, the hydraulic power transmission device comprising:
a front cover;
a fluid coupling main body including a turbine that rotates integrally with an input shaft of the transmission, the fluid coupling main body configured to transmit power from the engine to the transmission via the fluid;
a lock-up device provided between the front cover and the turbine, the lock-up device including a clutch portion, an output-side member, and a plurality of first coil springs, the clutch portion configured to transmit or cut off power from the front cover, the output-side member configured to receive power from the clutch portion, the output-side member coupled to the turbine, and an outer circumferential end portion of the output-side member engaged with each of the plurality of first coil springs; and
a dynamic damper configured to attenuate rotational speed fluctuation from the engine, the dynamic damper including a base plate, an inertial body and an elastic unit, the base plate directly fixed to the output-side member of the lock-up device, the inertial body configured to move in a rotation direction relative to the base plate, the elastic unit including a variable hysteresis torque generation portion and a plurality of second coil springs, the variable hysteresis torque generation portion configured to generate a variable hysteresis torque according to a relative speed difference between the base plate and the inertial body, the plurality of second coil springs coupling the base plate and the inertial body elastically in the rotation direction, wherein
the base plate is ring-shaped, and has a plurality of openings in an outer circumferential portion with predetermined intervals therebetween in a circumferential direction,
the variable hysteresis torque generation portion is disposed between two adjacent openings among the plurality of openings in the circumferential direction, and
the inertial body has
a first inertia ring and a second inertia ring arranged sandwiching the outer circumferential portion of the base plate in an axial direction, each of the first and second inertia rings having a ring-shape, the first and second inertia rings each including corresponding openings at positions that correspond to the openings of the base plate, and
the plurality of second coil springs of the elastic unit are housed in the openings of the base plate and the corresponding openings of the first and second inertia rings.

2. The hydraulic power transmission device according to claim 1, wherein
the dynamic damper is fixed to the output-side member of the lock-up device.

3. The hydraulic power transmission device according to claim 1, wherein
the elastic unit generates a larger hysteresis torque when the relative speed difference between the base plate and the inertial body is large than when the relative speed difference is small.

4. The hydraulic power transmission device according to claim 1, wherein
the elastic unit has a viscosity attenuation portion that generates the hysteresis torque by viscosity resistance.

5. The hydraulic power transmission device according to claim 4, wherein the viscosity attenuation portion has
an oil chamber filled with a hydraulic oil, and
a piston that is arranged in the oil chamber and can move in the rotation direction in the oil chamber along with the base plate.

6. The hydraulic power transmission device according to claim 1, wherein
the inertial body has
a first lid member and a second lid member respectively arranged on sides of the first inertia ring and the second inertia ring opposite to a base plate side, the first and second lid members arranged to obstruct the openings of the first and second inertia rings.

7. The hydraulic power transmission device according to claim 4, wherein the base plate has a notch, and the viscosity attenuation portion is housed, at least in part, in the notch of the base plate.

8. The hydraulic power transmission device according to claim 4, wherein the plurality of second coil springs and the viscosity attenuation portion are arranged along the circumferential direction.

* * * * *